Sept. 15, 1925.  
T. F. CLARK  
UNLOADER FOR TRUCKS  
Filed May 12, 1922

1,553,597

Inventor  
T. F. Clark.  
By Lynn L. Steele  
Atty.

Patented Sept. 15, 1925.

1,553,597

UNITED STATES PATENT OFFICE.

THOMAS F. CLARK, OF DENVER, COLORADO.

UNLOADER FOR TRUCKS.

Application filed May 12, 1922. Serial No. 560,378.

*To all whom it may concern:*

Be it known that I, THOMAS F. CLARK, a citizen of the United States, and resident of the city and county of Denver, State of Colorado, have invented certain new and useful Improvements in Unloaders for Trucks; and I do declare the following to be a full, clear, and exact description of the invention, such as will enable others skilled in the art to which it appertains to make and use the same, reference being had to the accompanying drawings, which form a part of this specification.

The object of this invention is to provide an unloading device for trucks especially adapted to unload separately a plurality of separated loads carried by the truck, and to discharge the loads at selected points at the sides of the truck.

Briefly the invention comprises a truck body having two or more compartments adapted to receive separate loads for separate delivery, as of coal, the inner or rear compartment having an unloading device or conveyor adapted to be operated at will and preferably discharging into the front compartment which has an unloading device for discharge from the end of the truck. At the end of the truck a laterally directed conveyor is provided for conducting the load to the side of the truck and dumping the same, a portion of this conveyor being vertically adjustable to reach windows of different heights or the end of a chute at different heights. Means is provided for selectively driving the unloading mechanism so as to unload one load at a time.

In the accompanying drawings, wherein one embodiment of the invention is disclosed, Fig. 1 is a longitudinal vertical section through a truck equipped with the present invention;

Figure 1:
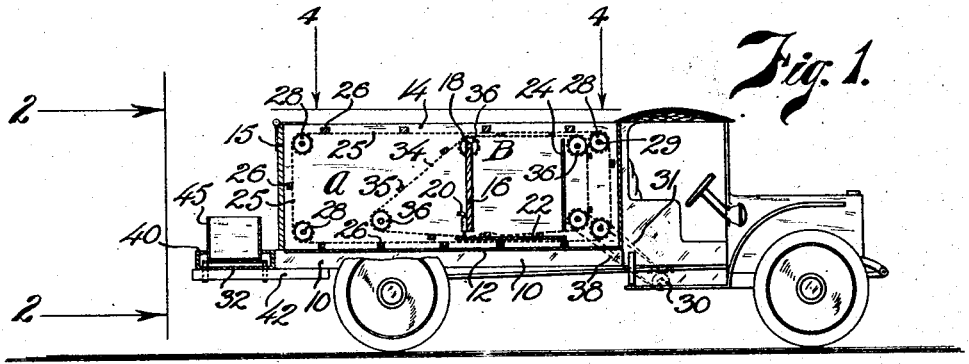
Figures 2, 3:
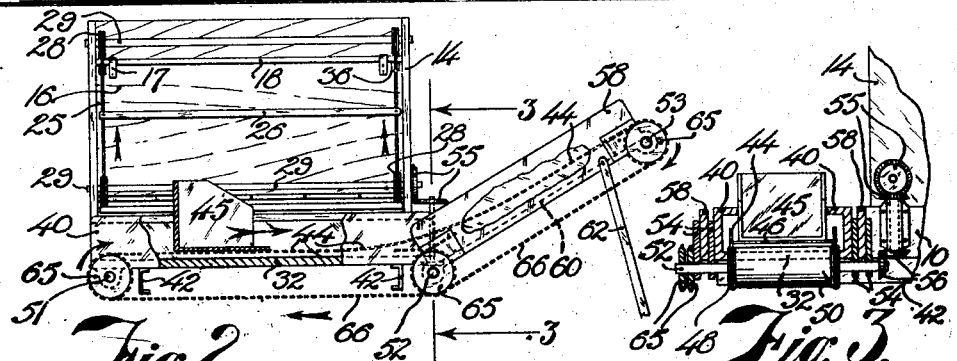
Fig. 2 is an end elevation with the end gate removed as indicated by line 2—2 of Fig. 1.
Fig. 3 is a detail taken on line 3—3 of Fig. 2.
Figure 4:
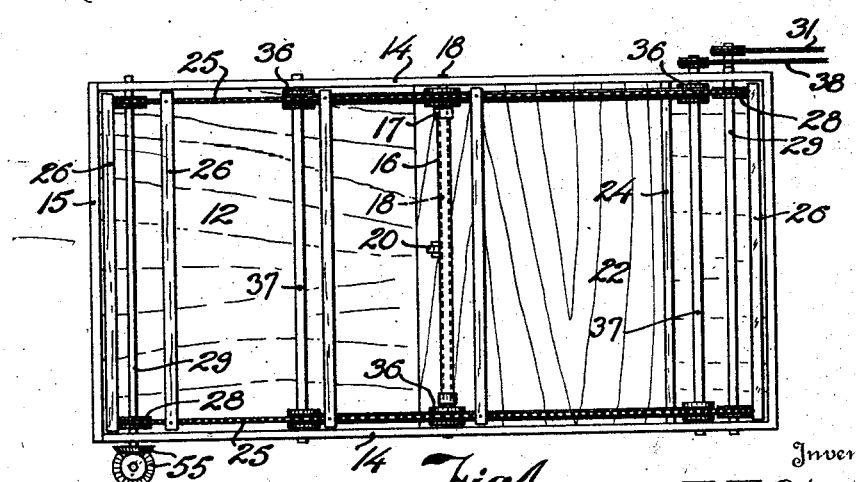
Fig. 4 is a plan of the truck body taken from line 4—4 of Fig. 1.

The chassis 10 of a truck is shown as provided with a floor 12, side walls 14 and a removable or hinged end gate 15. Within the truck a hinged partition 16 is carried between the side wall 14 by hinging devices 17 mounted on a transverse rod or shaft 18, a locking pin 20 being provided at the lower end of the partition and adapted to seat in a false bottom 22 spaced from the floor 12 and forming the bottom of the rear compartment B thus formed between the partition 16 and a rear wall 24.

The front compartment A, formed between the partition 16 and the end gate 15, is provided with an unloading device in the form of side chains 25 carrying cross bars 26 for feeding the load to the end of the truck body. These chains 25 pass over gears 28 mounted at the corners of the truck body upon shafts 29, the rear ends of the chains passing between the rear wall 24 of the compartment B and the back wall of the truck body and thence below the false bottom 22 into the bottom of the front compartment A for unloading thereof. The chains 25 are driven through the medium of the shafts 29 and a drive chain 31 leading to a selective drive mechanism 30 operated from the truck engine in any suitable manner and forming in itself no part of the present invention. Thus the load of the front compartment A is discharged onto the platform 32 at the end of chassis 10.

For unloading the rear compartment B side chains 34 are employed which carry cross bars 35 adapted to slide along the false bottom 22 and discharge the load of the rear compartment into the front compartment where it will be picked up and discharged by the cross bars 26. The chain 34 pass over gears 36 part of which are carried on shafts 37 and two of which are carried on shaft 18, the rear runs of the chains passing behind wall 24. These chains and gears are driven by a chain 38 leading from the drive mechanism 30, the chain 38 being driven only when desired to unload compartment B, at which time chains 25 will also be driven through chain 31.

The load carried onto the platform 32 is confined between channels 40 which may be formed integral therewith, these parts being carried upon arms secured to and extending from the chassis 10. Passing through these channels is a pair of conveyer chains 44 which carry a bucket 45 or a plurality of such buckets or scoops if desired. At the forward end of the platform 32 a drum 50 is provided whose ends have gears 48 for the chains 44, the drum 50 being adapted to have cross pieces 46 which support the bucket 45 engage therewith when the bucket is loaded.

Drum 50 and gears 48 are turned by a shaft 52, and the ends of chains 44 pass over gears on shafts 51 and 53, one of which is carried at the other end of the platform 32, these shafts being journaled in depending bearings 54. The shaft 52 is driven from the adjacent shaft 29 by two sets of bevel gears 55 and 56. A swinging chute is also provided whose sides 58 are journaled on the shaft 52 and have between them a bottom 60 over which the chains 44 and the bucket 45 pass to the gears and a drum at the upper end of the chute mounted on the shaft 53 in the same manner at the gears 48 and drum 50 are carried on shaft 52. The elevation of the outer end of the chute may be determined by a suitable prop 62 or other adjustable device. The end gears for the chains 44 are driven through the medium of a plurality of gears 65 mounted on the outer ends of the shafts 51, 52 and 53, and a pair of drive chains 66 on said gears. Thus the load discharged from the end of the truck onto the platform 32 will be picked up by the bucket 45 and carried to the end of the swinging chute 58 from which it may be dumped through an adjacent window or onto the end of a separate metal chute.

In this manner a load may be discharged from the front compartment A independently of the load in the rear compartment B, and then the load in rear compartment B may be unloaded at some other place later. When unloading the front compartment A, the selective drive 30 will be set to drive chain 31 only and thereby operate the unloader 25, 26. When unloading the rear compartment B, the pin 20 will be drawn to release the partition 16 so that the load on bottom 22 may move forward, and drive 30 will be set to drive both the unloading devices to carry the load from the rear compartment through the front compartment onto the platform 32. The bucket or scoop 45 will be filled as it moves along the platform and carry the discharged material along over drum 50 and through chute 58, discharging the same at the end of the chute. Either the weight of the contents of the scoop or some positive control, not shown, may be relied upon to hold the scoop to platform 32 when in operation and take any slack out of chains 44.

I claim:

1. In combination, a truck having a plurality of compartments, and a positively actuated unloading device in each compartment, one device being adapted to unload into the other compartment.

2. In combination, a truck having a plurality of compartments, a positively actuated unloading device for one compartment for discharging the load into another compartment, and a second unloading device for unloading said other compartment.

3. In combination, a truck having a pair of compartments one behind the other, a positively actuated unloading conveyor in the rear compartment for discharging into the other compartment, and a second unloading conveyor for the other compartment for discharging from the end of the truck.

4. In combination, a truck having a pair of compartments one behind the other, a positively actuated unloading device for the rear compartment for discharging into the front compartment, an unloading device for the front compartment for discharging from the end of the truck, and driving means for selectively operating said unloading devices.

5. In combination, a truck, a swinging partition therein forming front and rear compartments, a positively actuated unloading device for the rear compartment to discharge into the front compartment, an unloading device for the front compartment to discharge from the end of the truck, and driving means selectively operable to move said unloading devices.

6. In combination, a truck having front and rear compartments, a false bottom for the rear compartment, an unloading device movable across said false bottom for unloading said rear compartment, and a second unloading device movable under said false bottom and along the floor of the front compartment for unloading the latter.

In testimony whereof I affix my signature.

THOMAS F. CLARK.